(12) United States Patent
Palmute

(10) Patent No.: US 9,707,997 B2
(45) Date of Patent: Jul. 18, 2017

(54) TURN SYSTEM APPLIED TO THE FOUR WHEELS OF A SUGAR-CANE HARVESTER

(71) Applicant: Marchesan Implementos e Maquinas Agricolas Tatu S.A., Matao (BR)

(72) Inventor: Valter Palmute, Araras (BR)

(73) Assignee: Marchesan Implementos e Maquinas Agricolas Tatu S.A., Matao-SP (BR)

(*) Notice: Subject to any disclaimer, the term of this patent is extended or adjusted under 35 U.S.C. 154(b) by 0 days.

(21) Appl. No.: 15/310,024

(22) PCT Filed: Jan. 21, 2015

(86) PCT No.: PCT/BR2014/050032
§ 371 (c)(1),
(2) Date: Nov. 9, 2016

(87) PCT Pub. No.: WO2015/179936
PCT Pub. Date: Dec. 3, 2015

(65) Prior Publication Data
US 2017/0158232 A1 Jun. 8, 2017

(30) Foreign Application Priority Data
May 29, 2014 (BR) ...................... BR1020140130152

(51) Int. Cl.
*B62D 7/14* (2006.01)
*B62D 7/15* (2006.01)
(Continued)

(52) U.S. Cl.
CPC ............ *B62D 7/142* (2013.01); *A01B 69/007* (2013.01); *A01D 45/10* (2013.01); *B62D 5/12* (2013.01);
(Continued)

(58) Field of Classification Search
CPC . B62D 7/142; B62D 7/14; B62D 7/15; B62D 7/1554; B62D 7/1563; A01B 69/007; A01D 45/10
(Continued)

(56) References Cited

U.S. PATENT DOCUMENTS 4,270,337 A 6/1981 Pinto
4,887,632 A * 12/1989 Tanaka ................. B62D 7/1563
137/115.09
(Continued)

FOREIGN PATENT DOCUMENTS

AU 66083/65 5/1968
BR PI 0400321-7 B1 1/2005
(Continued)

OTHER PUBLICATIONS

International Searching Authority (ISA), International Search Report (ISR) and Written Opinion for International Application No. PCT/BR2014/050032, May 12, 2015, 9 pages, European Patent Office, Netherlands.

*Primary Examiner* — Keith J Frisby
(74) *Attorney, Agent, or Firm* — Alston & Bird LLP

(57) ABSTRACT

The present invention relates to a turn system actuated by hydraulic cylinders, applied to the four wheels of sugar-cane harvesters, wherein the harvester (80) comprises a rear axle (23) and a front axle (24), with wheel assemblies (9) associated to the axles (23, 24), wherein the rear axle (23) and the front axle (24) have a turn system, the one of the rear axle (23) being actuated by means of a double-action rear hydraulic cylinder (1) and that of the front axle (24) being actuated by means of a double-action front hydraulic cylinder (11), the hydraulic cylinders (1, 11) receiving a flow of oil through at least one flow divider (61) connected to an ortibrol (65) actuated by means of a steering wheel (60) of the harvester (80), the flow of oil received by the flow divider (61) being proportional to a factor related to the turn of the steering wheel (60), the turn system enabling the turn of the wheel assemblies (9) in amplitude ranging from 0.5 to 40 degrees, to the right or to the left, with respect to the longitudinal axis of the harvester (80).

8 Claims, 6 Drawing Sheets

(51) Int. Cl.
*A01D 45/10* (2006.01)
*A01B 69/00* (2006.01)
*B62D 5/12* (2006.01)

(52) U.S. Cl.
CPC ......... *B62D 7/1554* (2013.01); *B62D 7/1563* (2013.01)

(58) Field of Classification Search
USPC ...................................... 280/91.1; 180/24.01
See application file for complete search history.

(56) References Cited

U.S. PATENT DOCUMENTS

| | | | |
|---|---|---|---|
| 5,031,392 A | | 7/1991 | Baker |
| 5,303,533 A | | 4/1994 | Caillouet |
| 5,839,527 A | * | 11/1998 | Elser ................ F15B 11/22 180/24.01 |
| 2005/0166585 A1 | * | 8/2005 | Massaccesi ............ B62D 7/14 60/385 |

FOREIGN PATENT DOCUMENTS

| | | | |
|---|---|---|---|
| BR | MU 8501436-2 U | 2/2007 | |
| CA | 873684 | 6/1971 | |
| GB | 2 311 967 A | 10/1997 | |
| JP | 63101176 A * | 5/1988 | ........... B62D 7/1509 |
| JP | 2004284522 A * | 10/2004 | |

\* cited by examiner

TURN SYSTEM APPLIED TO THE FOUR WHEELS OF A SUGAR-CANE HARVESTER

CROSS REFERENCE TO RELATED APPLICATIONS

This application is a National Stage application, filed under 35 U.S.C. 371, of International Application No. PCT/BR2014/050032, filed Jan. 21, 2015, which application further claims priority to Brazilian Application No. BR102014013015-2, filed May 29, 2014; the contents of both of which are hereby incorporated by reference in their entirety.

BACKGROUND

Related Field

The present invention relates to a turn system actuated by hydraulic cylinders, applied to the four wheels of a sugar-cane harvester, provided with wheel assemblies.

DESCRIPTION OF THE PRIOR ART

Sugar-cane harvesting machines use wheel assemblies or track assemblies for moving over the sugar-cane field. Both systems have advantages and disadvantages.

Sugar-cane harvesters that use track assemblies are expensive, heavy and require periodic maintenance, besides having useful life shorter in comparison with the use of wheel assemblies.

A sugar-cane harvester with wheel assemblies usually has a driving axle, either the front or the rear one, and steering axle. One may also make it with total traction, but the steering is linked to a single axle.

The use of wheel assemblies is less expensive, lighter and dispenses with maintenance. However, there is a difficulty in carrying out curve maneuvers, since these harvesters require a larger turning radius.

Description of Related Art

Various types of turn systems applied to harvesters are already known from the prior art, as for example, the one described in patent document MU 85014326-2, which deals with a chassis for harvesters with flexible suspension, which enables articulation of the front axle and of the rear axle of a grain harvester. However, the focus of the system described in this document is the chassis suspension, and it exhibits a turn system other than that proposed in the present patent application.

Another attempt to solve the problem of turn radius of harvesters is presented in prior-art document PI 0400321-7, which employs central pivoting of the turn system applied to the front axle, which modifies the turn radius, but still has a larger turn radius than that proposed in the present patent application.

Further, one can cite documents U.S. Pat. No. 5,031,392, U.S. Pat. No. 5,303,533, and U.S. Pat. No. 4,270,337, which represent the prior-art harvesters provided with wheel assemblies and turn systems employed on only one of the axles.

The system proposed in the present patent application enables articulation of the four wheel assemblies, thus achieving a smaller turn radius than that represented in the prior art and still preserves the advantages provided by the use of wheel assemblies.

BRIEF SUMMARY

First, the objective of the invention is to diminish the turn radius required for end-of-street maneuvers, the moment when the harvester comes out of the street of harvested sugar-cane, enters the lane between the plantation meshes and returns to the next street of harvested sugar-cane.

Another objective of the invention is to facilitate and expedite the necessary re-alignments of the harvester within the operation of harvesting sugar-cane.

The present invention has the objective of providing a turn system applied to the four wheels of sugar-cane harvesters, wherein the harvester comprises a rear axle and a front axle with wheel assemblies associated to the axles.

The rear axle and the front axle have a turn system, said turn system of the rear axle being actuated by a double-action rear hydraulic cylinder and the turn system of the front axle being actuated by a double-action front hydraulic cylinder.

The rear and front hydraulic cylinder receive a flow of oil through at least one flow divider connected to an orbitrol, actuated by a steering wheel of the sugar-cane harvester.

The flow of oil received by the flow divider is proportional to a factor related to the turn of the steering wheel, while the turn system enables turn of the wheel assemblies in amplitude ranging from 0.5 to 40 degrees, to the right or to the left, with respect to the longitudinal axis of the sugar-cane harvester.

The front axle comprises a pair of axle sleeves and a pair of mounting pins for a suspension system.

Each wheel assembly of the rear axle has a pair of central turn pins, the central pins being fixed to a structural plate by locks and nuts, mounted on bearings, comprising supports for turn and supports for a traction system.

The front hydraulic cylinder has a pressure/return system on the right side and a pressure/return system on the left side, and the rear hydraulic cylinder has a pressure/return system on the right side and a pressure/return system on the left side, this system being fed by the flow divider.

The front hydraulic cylinder is associated to a front double piston and the rear hydraulic cylinder is associated to a rear double piston.

The pressure/return systems of the hydraulic cylinders are capable of enabling displacement of the double pistons to the left or to the right.

The front double piston, associated to the front axle, has its ends connected to a first pair of larger arms, by a first pair of articulations, and the ends of the larger arms connected to a first pair of smaller arms, by a second pair of articulations, each smaller arm being connected to an axle of a wheel hub.

The rear double piston, associated to the rear axle, has its ends connected to a second pair of larger arms, by a third pair of articulations, and the ends of the larger arms connected to a second pair of smaller arms, by a fourth pair of articulations, each smaller arm being connected to a turn articulation.

BRIEF DESCRIPTION OF THE FIGURES

The turn system applied to the four wheels for sugar-cane harvesters proposed by the present invention may be better understood through the following detailed description, which is based on the figures listed below.

DETAILED DESCRIPTION OF VARIOUS EMBODIMENTS

Figure 1:
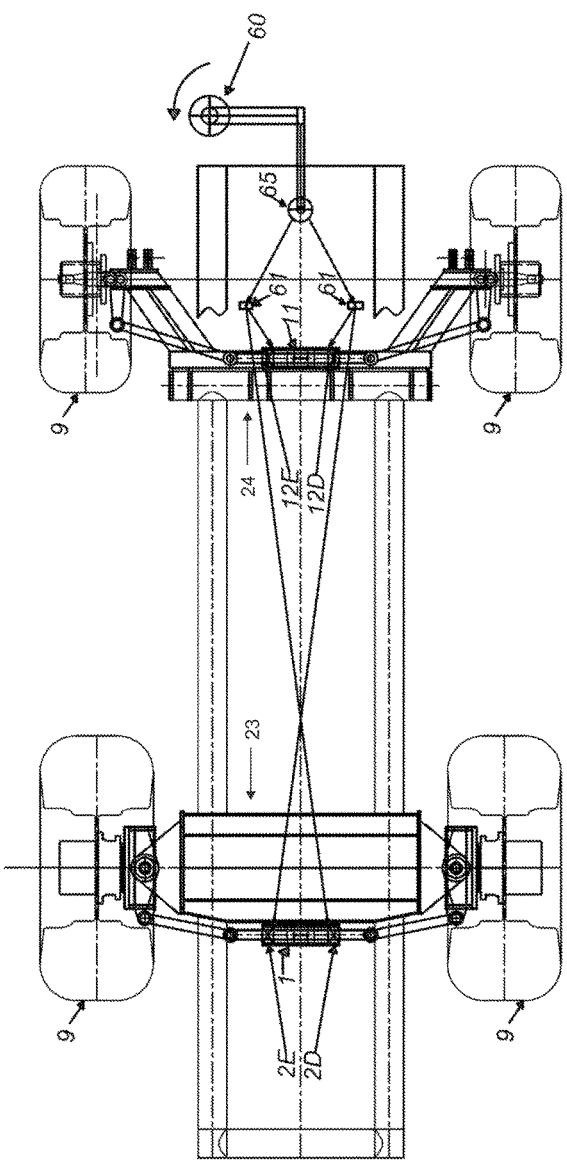
FIG. 1 is a top view of the turn system in central position.

As can be seen in FIG. 1, the turn system applied to the four wheels of a sugar-cane harvester 80 is represented in a central position and comprises a rear axle 23 and a front axle 24, with wheel assemblies 9, associated to the axles 23, 24.

The rear axle 23 and the front axle 24 have a turn system, the turn system of the rear axle 23 being actuated by means of a double-action rear hydraulic cylinder 1 and the turn system of the front axle 24 being actuated by means of a double-action front hydraulic cylinder 11.

The rear 1 and front 11 hydraulic axles receive a flow of oil through at least one flow divider 61 connected to an orbitrol 65 actuated by means of a steering wheel 60 of the sugar-cane harvester 80.

The flow of oil received by the flow dividers 61 is proportional to a factor related to the turn of the steering wheel 60, and thus the turn system enables turn of the wheel assemblies 9 by amplitude of 0.5 to 40 degrees, to the right or to the left, with respect to the longitudinal axis of the sugar-cane harvester 80.

Further in FIG. 1, one can observe that the front hydraulic cylinder 11 has a front pressure/return system on the right side 12D and a front pressure/return system on the left side 12E, and the rear hydraulic cylinder 1 has a rear pressure/return system on the right side 2D and a rear pressure/return system on the left side 2E, this system being fed by the flow divider 61.

In the preferred embodiment of the invention, shown in FIG. 1, an outlet of the flow divider 61 will feed the front pressure on the left side 12E of the front hydraulic cylinder 11 and the rear return of the right side 2D of the rear hydraulic cylinder. The other outlet of the flow divider 61 will feed the front return on the right side 12D of the front hydraulic cylinder 11 and the rear pressure on the left side 2E of the rear hydraulic cylinder 1.

Figure 2:
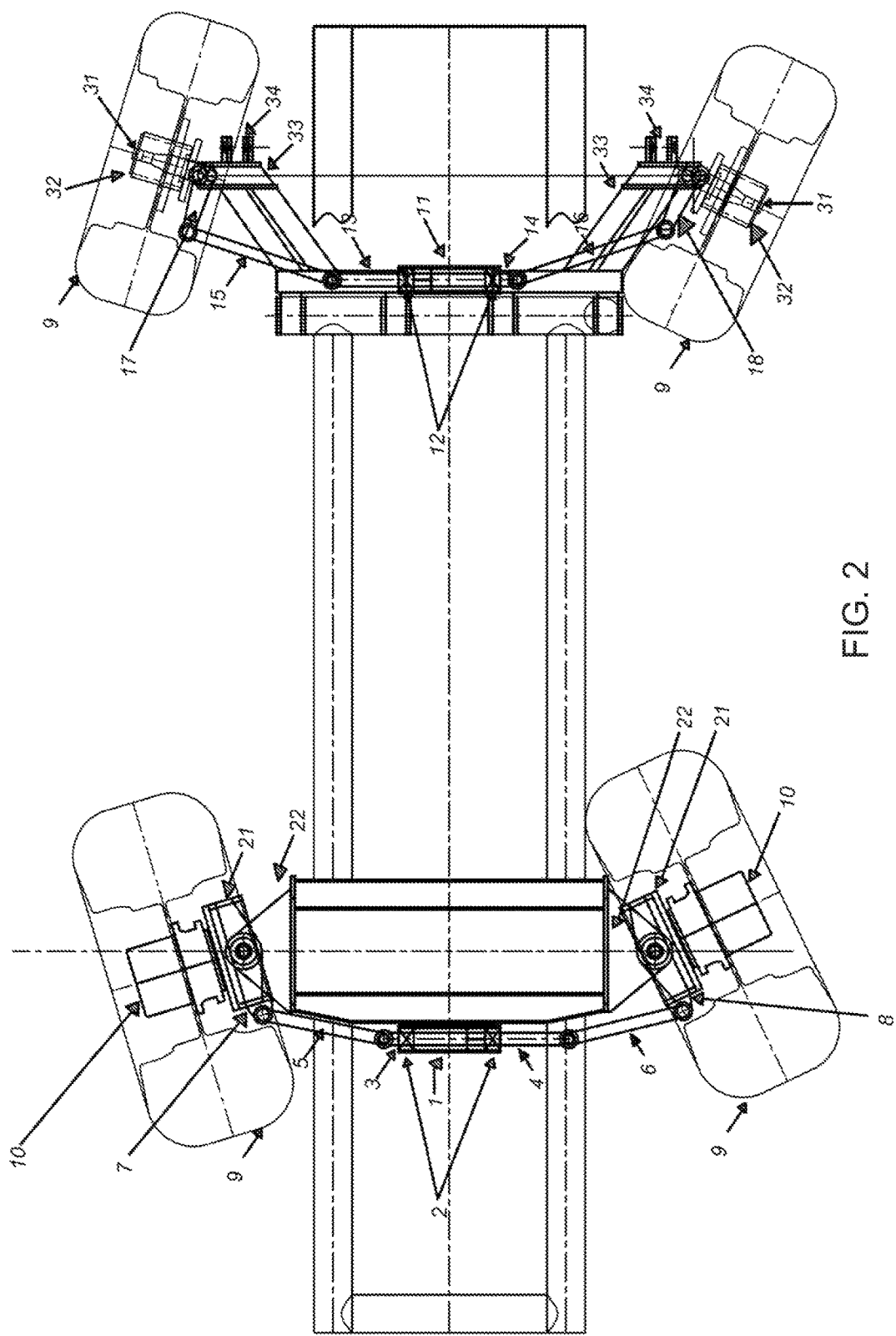
FIG. 2 is a top view of the turn system in the articulated position for maneuver of curve to the right.

In FIG. 2, one can observe that the front hydraulic cylinder 11 is associated to a double front piston 12 and the rear hydraulic cylinder 1 is associated to a double rear piston 2.

The pressure/return systems 2E, 2D, 12E, 12D of the hydraulic cylinders 1, 11, shown in FIG. 1, enable displacement of the double pistons 2, 12 to the left or to the right, shown in FIG. 2.

Figure 3:
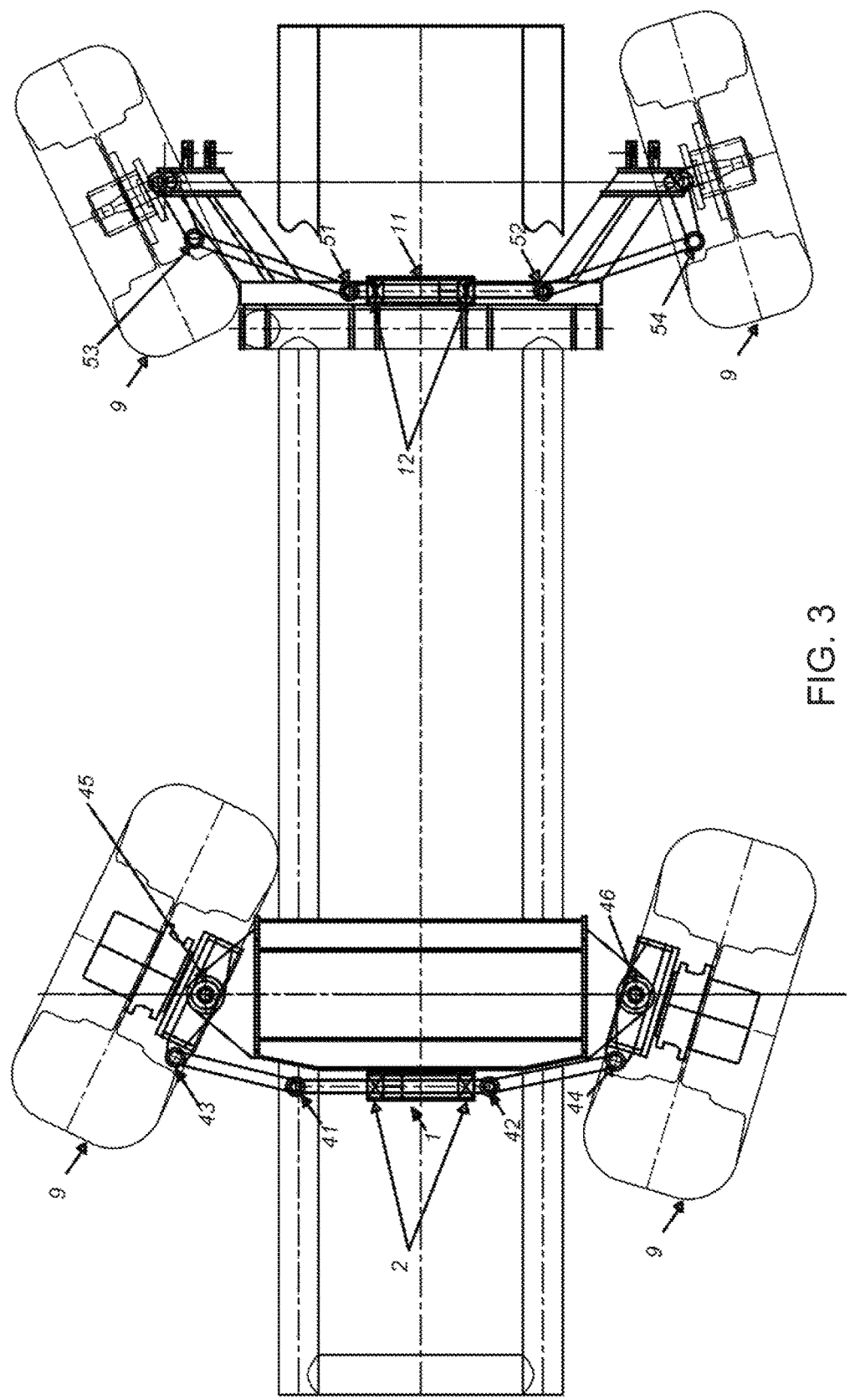
FIG. 3 is a top view of the turn system in the articulated position for maneuver to the left.

In case the operator turns the steering wheel 60 to make a maneuver of curve to the right, as shown in FIG. 2, the orbirol 65 will actuate the front hydraulic cylinder 11, causing the front double piston 12 to increase on the left side 13 and to shorten on the right side 14, transmitting turn movement to the wheel assemblies 9, through the articulations 51, 52, 53, 54, shown in FIG. 3, and the arms 15, 16, 17, 18, shown in FIG. 2.

Further in the maneuver of curve to the right, the orbitrol 65 will actuate the rear hydraulic cylinder 1 as well, which will have its movement proportional to the front hydraulic cylinder 11.

The orbitrol 65 will actuate the rear hydraulic cylinder 1, causing the rear double piston 2 to increase on the right side 4 and shorten on the left side 3, transmitting the turn movement to the wheel assemblies 9, through the articulations 41, 42, 43, 44, shown in FIG. 3, and the arms 5, 6, 7, 8, shown in FIG. 2.

The maneuver of curve to the left, observed in FIG. 3, will have the same configuration as the maneuver of curve to the right, the only difference lying in the displacement of the hydraulic cylinders 1, 1, which will be reverse. The front double piston 12 will increase on the right side 14 and shorten on the left side 13, just as the rear double piston 2 will increase on the left side 3 and shorten on the right side 4.

One can observe in FIG. 2 the front axle 24 comprising a pair of axle sleeves 33 and a pair of mounting pins 34 for the suspension system.

Figure 4:
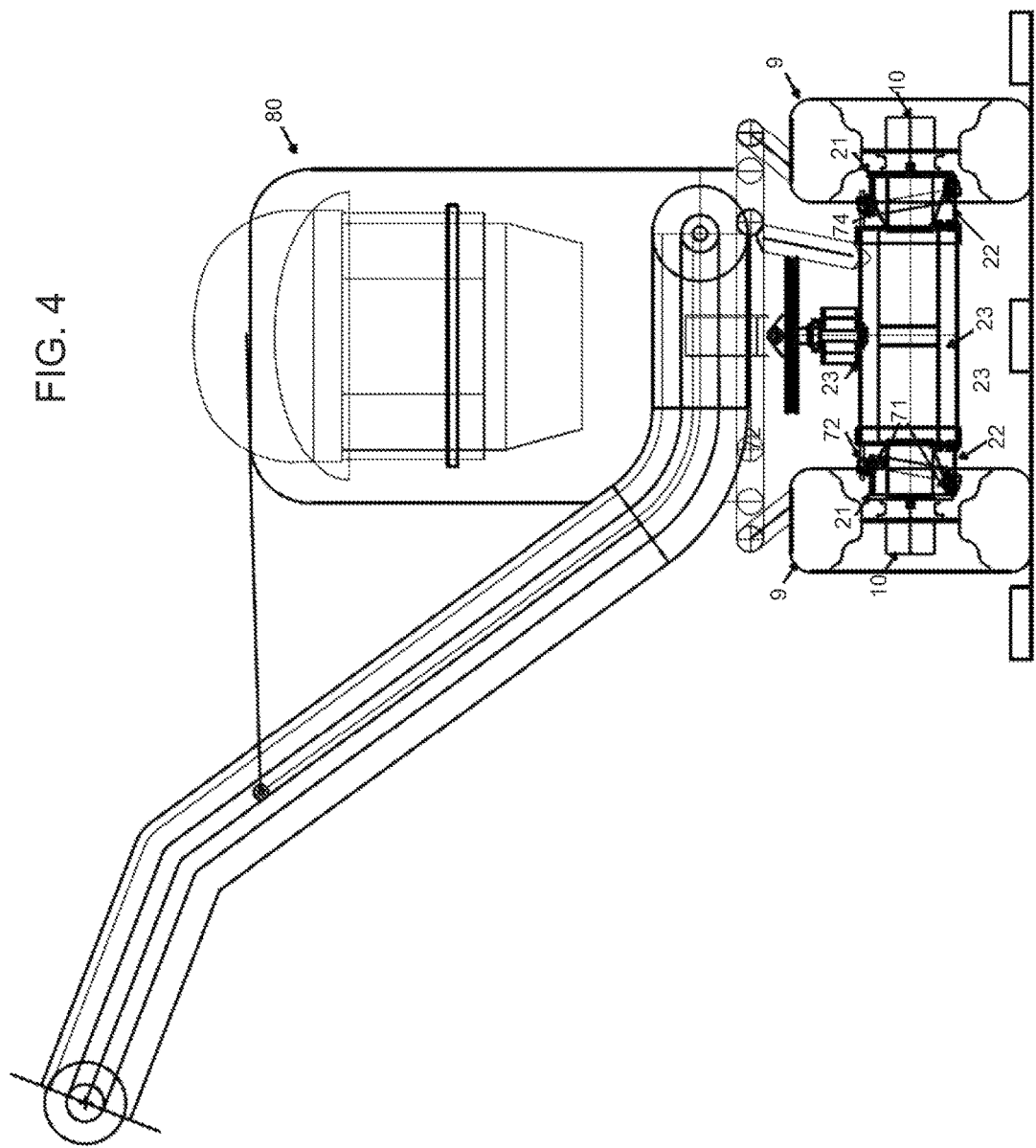
FIG. 4 is a view of the rear axle of the sugar-cane harvester.

The rear axle 23 and the sugar-cane harvester 80 are shown in FIG. 4.

Figure 5:
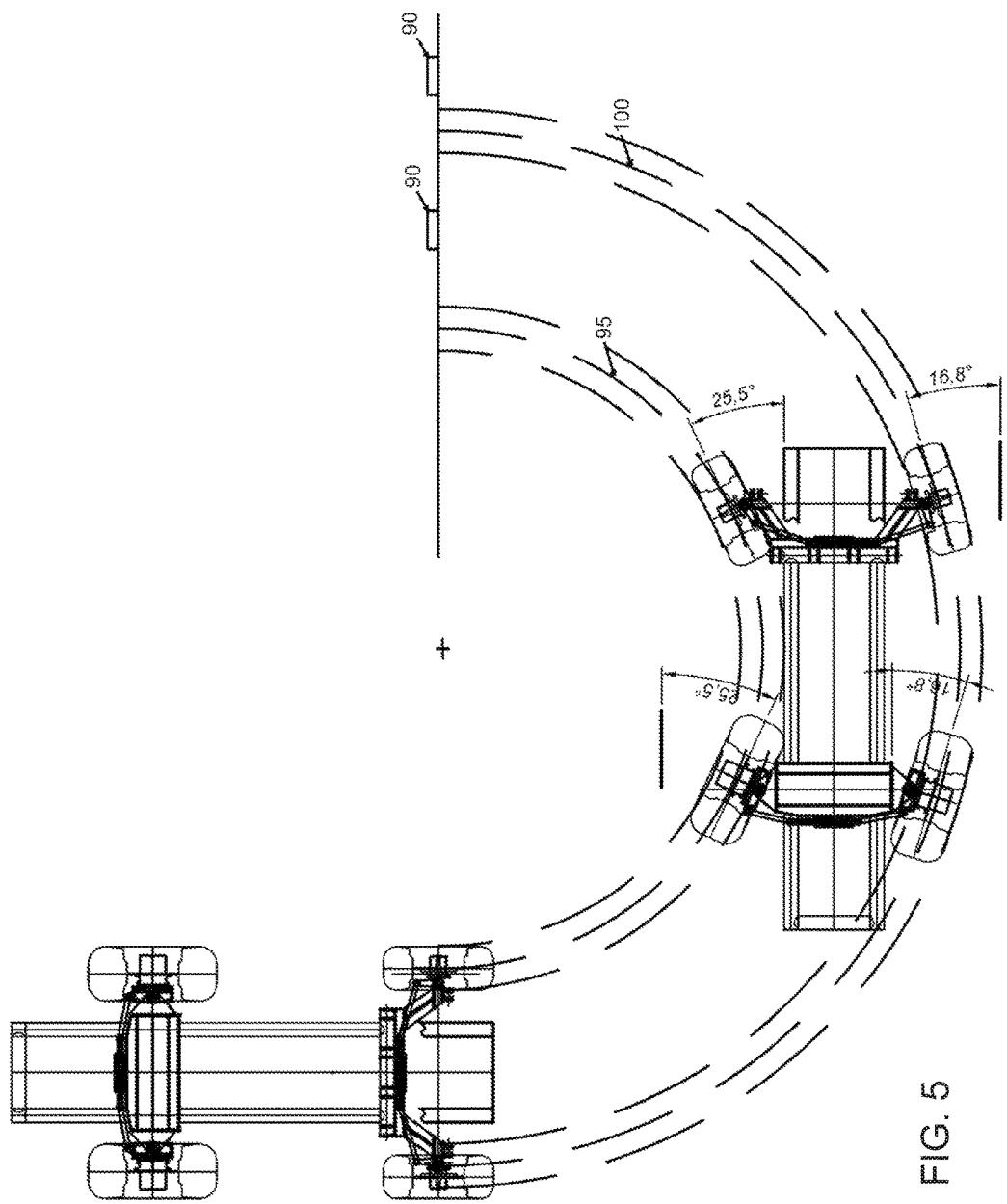
FIG. 5 is a view of the turn radius of the sugar-cane harvester.

FIG. 5 shows the representation of the cane streets 90 and of how the sugar-cane harvester 80 is moved between the cane streets 90. One can observe the turn radius 95 inside the curve and the turn radius 100 outside the curve, obtained through the turn system of the wheel assemblies 9.

Figure 6:
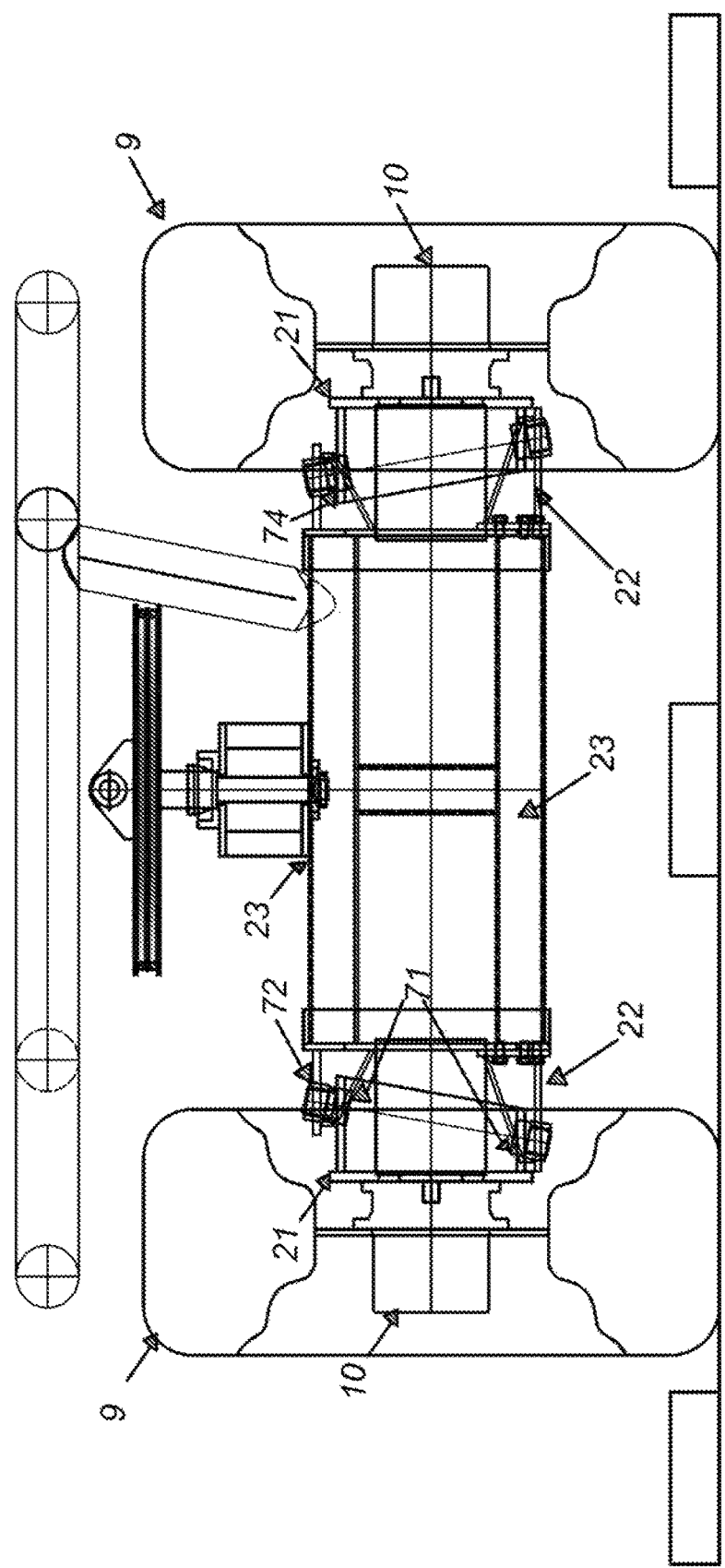
FIG. 6 is a detail view of the turn system of the rear axle.

The detailing of the rear axle 23 is represented in FIG. 6, wherein each wheel assembly 9 comprises a pair of central turn pins 71, which are fixed to a structural plate 22 by means of sleeves 72 mounted on bearings 74, comprising turn supports 21 and traction-system supports 10.

A possible configuration of the present invention is made by using slave cylinders. When the steering wheel 60 turns, the flow of air sent by the orbitrol 65, which may or may not contain flow dividers 61, will feed the front pressure/return system on the left side 12E of the front hydraulic cylinder 11, coming out through the front pressure/return system on the right side 12D of the front hydraulic cylinder 11 and going into the rear pressure/return system on the right side 2D of the rear hydraulic cylinder 1 and coming out through the rear pressure/return system on the left side 2E of the rear hydraulic cylinder.

This embodiment will generate movement equal to that described in the preferred embodiment, transmitting the turn movement to the wheel assemblies 9. The factor relating to the turn of an axle with respect to the other will be predetermined by the diameters of the cross-sections of the hydraulic cylinders 1, 11 and by the difference in the flow sent by the orbitrol 65 and flow divider 61.

In another possible embodiment of the present invention, the turn of the rear wheel assemblies 9 is released only when the turn of the front wheel assemblies 9 reaches a determined angle value (which may range from 0.5 to 40 degrees) higher than the angle required for minor alignments during the harvest. In this way, the turn of the rear wheel assemblies 9 will be released for great adjustments and maneuvers, thus facilitating the operation of the sugar-cane harvester 80.

This embodiment between the rear and front wheel assemblies 9, shown above, may also be applied with regard to the front/rear, left/right and right/left wheel assemblies 9, wherein one wheel assembly 9 will only be released when the other wheel assembly 9 reaches a determined angle value greater than the angle required for minor alignments during the harvest.

The turn system applied to the four wheels enables the sugar-cane harvesters 80 to be used with greater output and efficiency, chiefly in sugar-cane plantations that have short cane streets, which need a larger number of curve maneuvers, and in sugar-cane fields with narrow lanes, where the harvesters may tread on harvested streets or invade the sugar-cane field to be harvested in order to manage to make the curve maneuver.

A preferred example of embodiment having been described, one should understand that the scope of the present invention embraces other possible variations, being limited only by the contents of the accompanying claims, which include the possible equivalents.

The invention claimed is:

1. A turn system applied to the four wheels of a sugar-cane harvester (80), the sugar-cane harvester (80) comprising a rear axle (23) and a front axle (24), with wheel assemblies (9) associated to the axles (23, 24), wherein the rear axle (23) and the front axle (24) have a turn system, the turn system of the rear axle (23) being actuated by means of a double-action rear hydraulic cylinder (1) and the turn system of the front axle (24) being actuated by means of a double-action front hydraulic cylinder (11), the rear (1) and front (11) hydraulic cylinders receiving a flow of oil through at least one flow divider (61) connected to an orbitrol (65) actuated by means of a steering wheel (60) of the sugar-cane harvester (80), the oil flow received by the flow divider (61) being proportional to a factor related to the turn of the steering wheel (60), and the turn system enabling the turn of the wheel assemblies (9) in amplitude ranging from 0.5 to 40 degrees, to the right or to the left, with respect to the longitudinal axis of the sugar-cane harvester (80).

2. The system according to claim 1, wherein the front axle (24) comprises a pair of axle sleeves (33) and a pair of mounting pins (34) for the suspension system.

3. The system according to claim 1, wherein each wheel assembly (9) of the rear axle (23) has a pair of central turn pins (71), the central pins being fixed to a structural plate (22) by means of sleeves (72) mounted on bearings (74), comprising turn supports (21) and traction-system supports (10).

4. The system according to claim 1, wherein the front hydraulic cylinder (11) has a front pressure/return system on the right side (12D) and a front pressure/return system on the left side (12E), and the rear hydraulic cylinder (1) has a rear pressure/return system on the right side (2D) and a rear pressure/return system on the left side (2E), this system being fed by the flow divider (61).

5. The system according to claim 4, wherein the pressure/return systems (2E, 2D, 12E, 12D) of the hydraulic cylinders (1, 11) are capable of displacing the double pistons (2, 12), to the left or to the right.

6. The system according to claim 4, wherein the front double piston (12), associated to the front axle (24), has its ends (13, 14) connected to a first pair of larger arms (15, 16), by a first pair of articulations (51, 52), and the ends of the larger arms (15, 16) connected to a first pair of smaller arms (17, 18), by a second pair of articulations (53, 54), each smaller arm (17, 18) connected to an axle (31) of a wheel hub (32).

7. The system according to claim 4, wherein the rear double piston (2), associated to the rear axle (23), has its ends (3, 4) connected to a second pair of larger arms (5, 6), by a third pair of articulations (41, 42), and the ends of the larger arms (5, 6) connected to a second pair of smaller arms (7, 8), by a fourth pair of articulations (43, 44), each smaller arm (7, 8) being connected to a turn articulation (45, 46).

8. The system according to claim 1, wherein the front hydraulic cylinder (11) is associated to a front double piston (12) and the rear hydraulic cylinder (1) is associated to a rear double piston (2).

* * * * *